United States Patent [19]

Suzuki et al.

[11] Patent Number: 5,025,196
[45] Date of Patent: Jun. 18, 1991

[54] IMAGE FORMING DEVICE WITH BEAM CURRENT CONTROL

[75] Inventors: Hidetoshi Suzuki, Atsugi; Ichiro Nomura; Toshiaki Majima, both of Tokyo; Mitsuru Yamamoto, Atsugi, all of Japan

[73] Assignee: Canon Kabushiki Kaisha, Tokyo, Japan

[21] Appl. No.: 545,115

[22] Filed: Jun. 26, 1990

Related U.S. Application Data

[63] Continuation of Ser. No. 55,935, Jun. 1, 1987, abandoned.

[30] Foreign Application Priority Data

Jun. 2, 1986 [JP] Japan ............................ 61-125917
Jun. 16, 1986 [JP] Japan ............................ 61-138226
Jul. 31, 1986 [JP] Japan ............................ 61-178664

[51] Int. Cl.$^5$ ............................................ H05B 41/00
[52] U.S. Cl. ....................................... 315/168; 315/3
[58] Field of Search ................. 357/13, 23.1, 52, 55; 315/3, 169.3, 169.2

[56] References Cited

U.S. PATENT DOCUMENTS

| | | | |
|---|---|---|---|
| 3,887,839 | 6/1975 | Ota et al. | 315/383 |
| 3,925,706 | 12/1975 | Nomura et al. | 315/383 |
| 4,251,755 | 2/1981 | Bryden | 315/383 |
| 4,259,678 | 3/1981 | Van Gorkom et al. | 357/13 |
| 4,363,930 | 12/1981 | Van Gorkom et al. | 357/13 |
| 4,370,674 | 1/1983 | Johnson et al. | 315/383 |
| 4,382,254 | 5/1983 | Ranalli | 315/383 |
| 4,595,955 | 6/1986 | Groves et al. | 358/217 |
| 4,631,591 | 12/1986 | Lee | 315/383 |
| 4,633,145 | 12/1986 | Osawa et al. | 358/29 |
| 4,651,052 | 3/1987 | Hoeberechts | 315/346 R |
| 4,651,064 | 3/1987 | Parker et al. | 315/383 |
| 4,698,557 | 10/1987 | Harlos | 315/383 |
| 4,705,992 | 11/1987 | Ciocan | 358/168 |
| 4,724,364 | 2/1988 | Newton | 315/383 |
| 4,745,344 | 5/1988 | Tomii et al. | 315/383 |

Primary Examiner—Eugene R. Laroche
Assistant Examiner—Tan Xuan Dinh
Attorney, Agent, or Firm—Fitzpatrick, Cella, Harper & Scinto

[57] ABSTRACT

An image forming device having an electron beam generating device is provided which comprises a plural number of electron beam generating sections and a deflecting means capable of deflecting the group of electron beams emitted from this electron beam generating device in the two directions of X and Y.

17 Claims, 6 Drawing Sheets

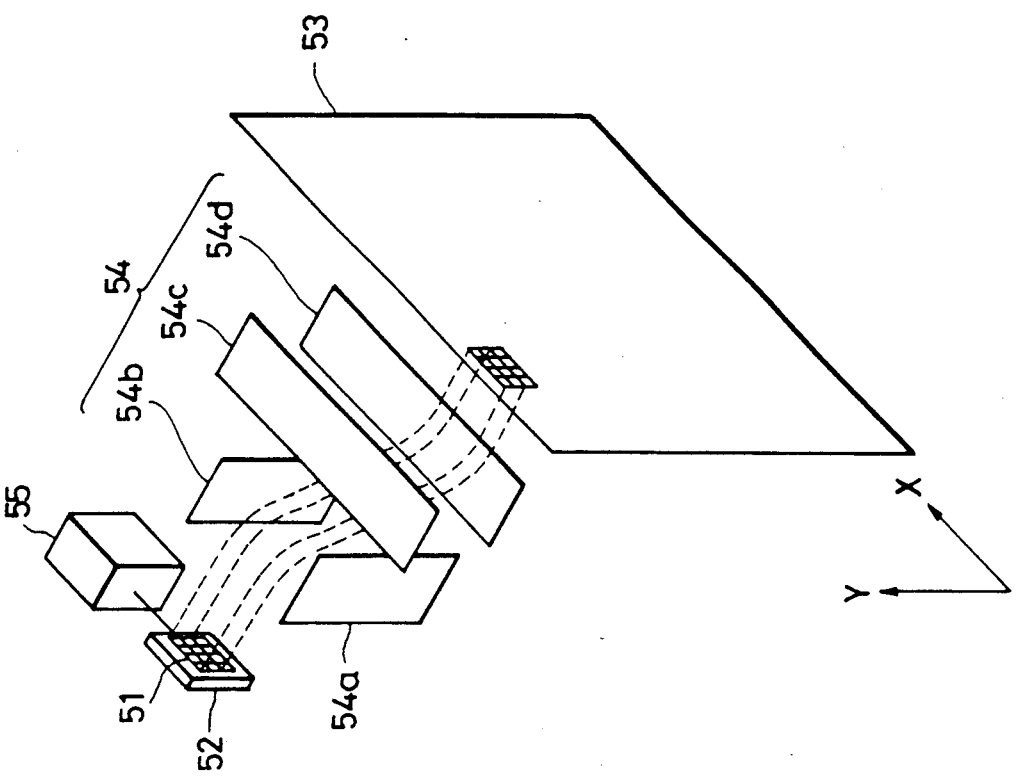
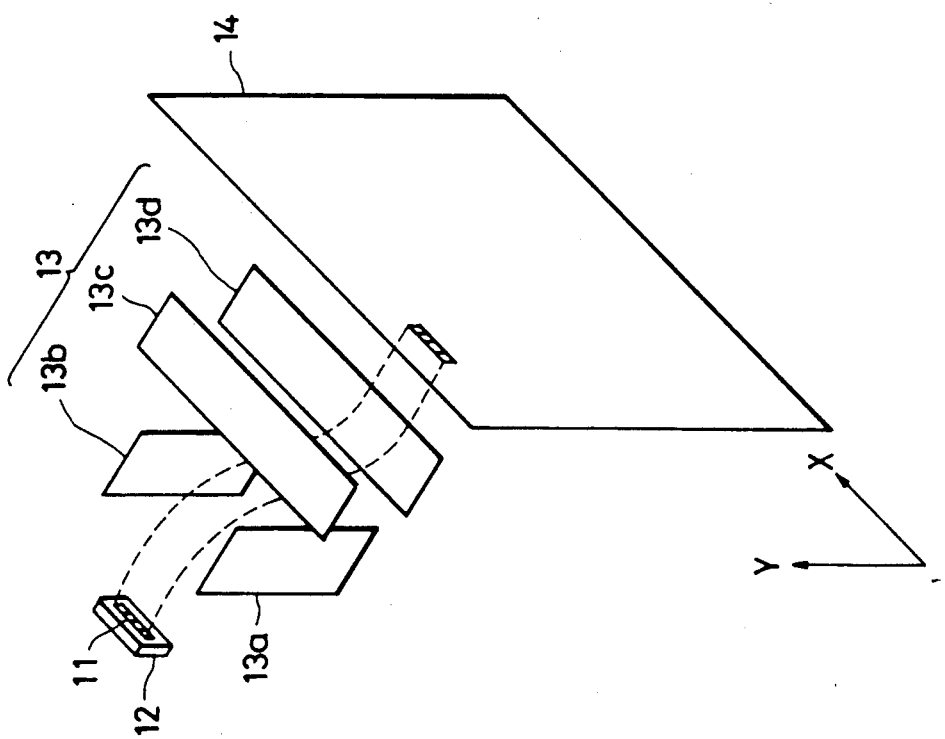

IMAGE FORMING DEVICE WITH BEAM CURRENT CONTROL

This application is a continuation of application Ser. No. 07/055,935, filed June 1, 1987 abandoned.

BACKGROUND OF THE INVENTION

1. Field of the Invention

This invention relates to an image forming which forms an image by use of electron beam, and more particularly to an image forming device by use of an electron beam generating device provided with a plural number of electron beam generating sections.

2. Related Background Art

In recent years, electron beam generating devices which use of a cold cathode have been developed, as disclosed in Japanese Patent Publication No. 30274/1979, Japanese Laid-Open Patent Publication No. 111272/1979 (corresponding to U.S. Pat. No. 4,259,678), Japanese Laid-open Patent Publication No. 15529/1981 (corresponding to U.S. Pat. No. 4,303,930), Japanese Laid-Open Patent Publication No. 38528/1982, etc.

The cold cathode in the above electron beam generating device, in contrast to the hot cathode most generally employed in electron beam generating devices in which a great restriction is imposed in the degree to which it is practiced to decreasing the electron-releasing surface area, due to the problem of durability, has the advantage of substantially avoiding such restriction. Also, hot electrodes cannot easily be arranged in a plural number with uniform characteristics with high positional precision, while cold electrodes can be advantageously arranged in a plural number with uniform characteristics and high positional precision by forming them using such a production process such as photolithography or electron beam lithography. Therefore, such or analogous technique make it possible to obtain an electron beam generating device provided with a large number of electron beam generating sections, and application of this technique in various image forming devices, typically display devices, has been hoped for.

However, when increase in capacity of the image forming device is attempted by an electron beam generating device having a plural number of electron beam generating sections arranged two-dimensionally as described above, the following problems are involved. First, when an image is to be formed by deflection scanning of the electron beams emitted from the above electron beam generating device, there is the problem of distortion of image as the deflection angle becomes greater. This distortion can with difficultly be corrected by an electron optical system which corrects the distortion of a point electron source of the prior art, since the group of electron beams has a two-dimensional size.

Also, in the prior art, the cold cathode type of solid electron beam generating device to be used for this kind of image forming device (hereinafter referred to as a cold cathode type member) has been considered for application to display devices, recording devices, etc., for such reasons as low actuation temperature, high electron generation density (current density), etc., and various proposals have been made.

FIG. 14 shows a schematic illustration of a cold cathode member of the prior art. The cold cathode member shown in FIG. 14 is disclosed in Japanese Laid-Open Patent Publication No. 14429/1981, and generates electron beams by supplying reverse voltage to the semiconductor, which has a p-n junction.

In FIG. 14, 101 is a p-type semiconductor of silicon, 102 is an n-type semiconductor of silicon, 103 is electrodes for applying reverse bias to the p-n junction semiconductor, 104 is an insulator, 105 is a window for generating electrons, 106 is an accelerating electrode for acceleration of electrons generated, 107 is a detector for measuring the amount of electron beam, 108 is an ammeter for displaying the magnitude of the electron beam detected by 107 as a current density, 109 is a power source for applying voltage to the p-n junction semiconductor, and 100 is a power source for applying voltage to the accelerating electrode 106. In the above construction, when a predetermined reverse voltage is applied from the power source 109 to the p-n junction semiconductor, avalanche breakdown occurs in the semiconductor. As a result, electrons in the vicinity of the p-n junction semiconductor acquire great kinetic energy, and the electrons are released from the window 105. The released electrons are further accelerated by the accelerating electrodes, 106 to which is applied a constant voltage of 5 to 150 V, to become electron beams.

In the prior art, the cold cathode members of these image forming devices become elevated in temperature during actuation, whereby the discharge amount of electron beam varies and therefore the driving voltage on the cold cathode member is required to be successively changed for compensation for the variation, thus involving the drawback that it can be actuated continuously only with difficulty. For example, when this kind of a cold cathode member is used at the cathode portion of CRT, the temperature of the cathode itself becomes higher to vary the amount of electron beam or beams generated, whereby there has been the drawback that the appropriate luminance cannot be obtained. In order to obtain again the appropriate luminance, the cathode is required to be cooled and therefore continuous actuation could only with difficulty be done.

SUMMARY OF THE INVENTION

The present invention has been accomplished in view of the state of the art as described above, and an object of the present invention is to provide an image forming device which performs image formation by an electron beam generating device provided with a plural number of electron beam generating sections.

Also, another object of the present invention is to remove the drawbacks of prior art examples as described above, and to provide an image forming device capable of continuous actuation simultaneously with improvement of bad actuation caused by temperature rise of the cold cathode type solid electron beam generating member.

According to one aspect of the present invention, there is provided an image forming device comprising a cold cathode member, an accelerating electrode member for withdrawing the electron beam generated from said cathode member, a member for modulating said electron beam, a member for deflecting said electron beam and an image deforming member by use of said electron beam, wherein a detection means for detecting the current value flowing to said accelerating electrode member and a control means for outputting the control signal in proportion to the current value detected are provided, and the electron beam quantity from said cold cathode member is maintained constant by supplying the control signal from said control means to the power source portion of said cold cathode member or accelerating electrode member.

According to another aspect of the present invention, there is provided an image forming device, having an electron beam generating device provided with a plural number of electron beam generating sections and a deflecting means capable of deflecting the electron beams emitted from the electron beam generating device in the two directions of X and Y.

According to a further aspect of the present invention, there is provided an image forming device having electron beam generating device provided with a plural number of electron beam generating sections arranged two-dimensionally and a deflecting means capable of scanning the electron beams emitted from said electron beam generating device to a member to be irradiated successively in each region of the member to be irradiated, wherein the device has a correcting means for the image distortion by deflection of the electron beams by changing the pattern of the electron beams emitted by controlling the driving of the electron beam generating device.

BRIEF DESCRIPTION OF THE DRAWINGS

FIG. 1 is a schematic illustration of one Example of the present invention,

FIG. 5 is a schematic illustration of another example of the present invention, FIG. 6 a schematic illustration of the scanning state obtained by the group of electron beams.

DETAILED DESCRIPTION OF THE INVENTION

Figure 2:
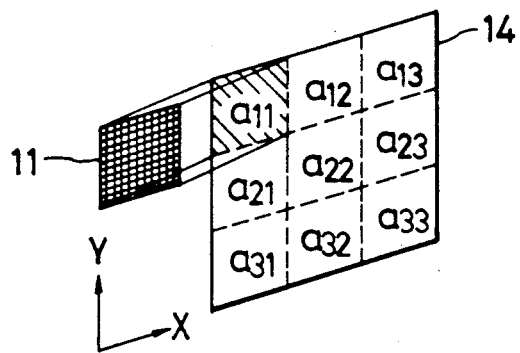
FIG. 2 a schematic illustration of the scanning state obtained by the group of electron beams, FIG. 3 a side view of FIG. 1, and FIGS. 4A-4C are diagrams showing in time series the voltages applied to the deflecting means.

To describe about the means employed for accomplishing the above objects by referring to FIG. 1 which corresponds to an example of the present invention, the present invention is devised to comprise an electron beam generating device 12 having a plural number of electron beam generating sections 11 and an image forming device having deflecting means 13 capable of deflecting the group of electron beams emitted from the electron beam generating device 12 in the two directions X and Y. In the present invention, the directions X and Y refer to the two directions which are perpendicular to the electron beam irradiated from the electron beam generating device 12 and which also cross at a right angle with each other.

Since the electron beam generating device 12 comprises a plural number of electron beam generating sections 11, by emitting a group of electron beams, electron beams can be irradiated at one time on a predetermined region on the member 14 which forms an image by irradiation of electron beams. On the other hand, since the above group of electron beams can be deflected in the two directions of X and Y by the deflecting means 13, the whole image forming region on the member to be irradiated 14 can be scanned by irradiation with the group of electron beams without overlapping in each predetermined region as mentioned above, whereby any desired image can be formed.

As shown in FIG. 1, the electron beam generating device 12 and the member to be irradiated 14 are provided as opposed to each other, and deflecting means 13 are arranged between both of these.

The electron beam generating device 12 is provided with a plural number of electron beam generating sections 11 provided integrally, for example, by arranging a plural number of cathodes on the same substrate. As the cathode for forming the electron beam generating section 11, a cold cathode is the most suitable. The electron beam generating sections 11 in this Example can be driven each independently, and they are one-dimensionally arranged so as to irradiating electron beam within the predetermined line region on the member to be irradiated 14. Here, one-dimensional arrangement refers to arrangement in an array either in the longitudinal, lateral or oblique direction.

The deflecting means 13 in this Example is constituted of a pair of flat plate electrodes 13a, 13b left and right (X direction) and a pair of flat plate electrodes 13c and 13d up and down (Y direction). The flat plate electrodes 13a and 13b, 13c and 13d of the respective sets are arranged as opposed to each other in parallel, respectively, interposing therebetween the pathway of the entire beams generated from the electron beam generating section 11. Between the flat plate electrodes 13a and 13b, and between the flat plate electrodes 13c and 13d, the desired voltage can be applied to each independently from respective variable voltage sources (not shown). As the deflecting means 13, other than the above flat plate electrodes 13a-13d, electromagnetic coils, etc., can be used.

The member 14 to be irradiated forms a fixed image or a variable image by irradiation of the electron beams. More specifically, when the present image forming device is used as the display device, for example, a fluorescent screen, etc., provided by coating of a phosphor which emits light by irradiation of an electron beam can be used. Also, when it is used as a photoresist device, it can be a member having a photoresist layer.

As shown in FIG. 1, a plural number of parallel electron beams emitted from the electron beam generating sections 11 of the electron beam generating device 12 are deflected by the deflecting means 13 to be irradiated on a one-dimensionally shaped region on the member to be irradiated 14. And, as described later, by application of an appropriate voltage between the flat plate electrodes 13a and 13b and between 13c and 13d which are deflecting means 13, it becomes possible to scan successively the whole region on the member to be irradiated 14 without overlapping. During that operation, by turning appropriately ON and OFF the plural number of electron beam generating sections of the electron beam generating device 12 corresponding to the scanning position, any desired image can be formed on the member to be irradiated 14.

In the Example as described above, the electron beam generating sections 11 are arranged one-dimensionally, but they are preferably and generally arranged two-dimensionally, because scanning within a shorter time becomes possible using a two-dimensional arrangement. Here, the term two-dimensional arrangement refers to arrangements of a plural number of arrangements in both longitudinal and lateral directions. By referring to examples when the electron beam generating sections 11 are arranged two-dimensionally, scanning of electron beams in the present device is further described in FIG. 2 to FIG. 4.

FIG. 2 shows the irradiated divisions when the group of electron beams emitted from the electron beam generating device 12 in which the electron beam generating sections 11 are arranged two-dimensionally are irradiated on the member to be irradiated 14 without overlapping. The regions $a_{11}$–$a_{33}$ shown by the dotted lines on the member to be irradiated 14 are formed by dividing the image forming region on the surface of the member to be irradiated 14 for convenience of explanation. The respective regions $a_{11}$–$a_{33}$ are shaped similarly to the arranged regions of the respective electron beam generating sections 11. By irradiating successively the group of electron beams onto each of these regions $a_{11}$–$a_{33}$ as one unit, the whole image forming region on the member to be irradiated 14 can be scanned without overlapping.

Figure 3:
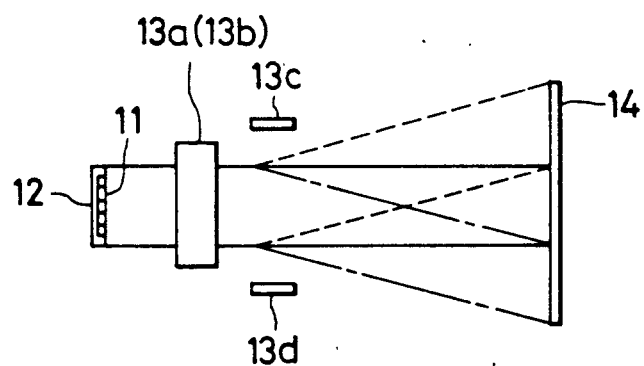

FIG. 3 is a side view of the image forming device shown in FIG. 1, and a pair of flat plate electrodes 13a and 13b has the function of deflecting the group of electron beams emitted from the electron beam generating sections 11 all together in the X direction. Similarly, a pair of the opposed electrodes 13c and 13d has the function of deflecting the group of electron beams all together in the Y direction. The dotted lines drawn in the Figure represent the pathways of the group of electron beams emitted from the electron beam generating sections 11 and irradiated onto either region of $a_{11}$, $a_{12}$ or $a_{13}$ in FIG. 2, and similarly the solid lines represent the pathways of the group of electron beams irradiated onto either region of $a_{21}$, $a_{22}$ or $a_{23}$ in FIG. 2. Also, the chain lines are pathways of the group of electron beams irradiated on either region of $a_{31}$, $a_{32}$ or $a_{33}$ in FIG. 2.

FIG. 4 is a diagram showing the voltages applied between the flat plate electrodes 13a and 13b and between 13c and 13d shown in FIG. 3 in time series.

Now, suppose that, in order to form one image on the member to be irradiated 14, the group of electron beams is irradiated by scanning the above sub-divided regions $a_{11}$–$a_{33}$ in the order of $a_{11}$, $a_{12}$, $a_{13}$, $a_{21}$, $a_{22}$, $a_{23}$, $a_{31}$, $a_{32}$ and $a_{33}$.

Figure 4A:
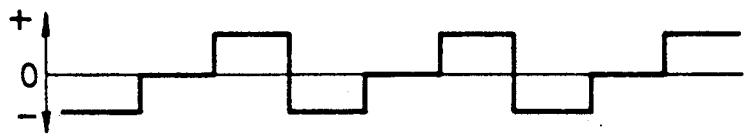
Figure 4B:
Figure 4C:
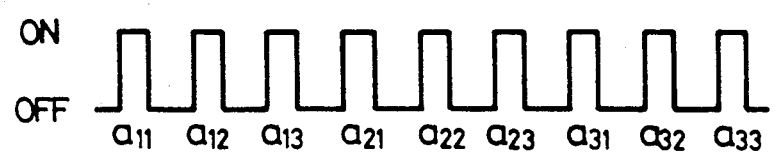

When an image is formed by performing raster scanning by use of a single electron beam source (three in the case of a color-CRT) as in the case of a CRT in general, a voltage shaped in triangular wave (saw tooth wave) may be applied between the flat plate electrodes 13a and 13b and between the 13c and 13d. However, for performing scanning for each region as mentioned above by use of a plural number of electron beam generating sections 11 arranged two-dimensionally, overlapped irradiation will be caused by use of a triangular wave. Accordingly, in the device according to the present invention, it is preferable to perform scanning as follows. That is, a voltage wave in a shape of steps as shown in FIG. 4A may be applied between the flat plate electrodes 13a and 13b. The Figure shows the voltage at the flat plate electrode 13b when the flat plate electrodes 13a is made as the standard. Similarly FIG. 4B shows the voltage wave form to be applied between the flat plate electrodes 13c and 13d, and also FIG. 4C shows the timing of driving of the electron beam generating sections 11 on the same time axis. In the timing, shown as the ON state in this Figure, from among the plural number of electron beam generating sections provided in the electron beam generating device 12, only necessary ones corresponding to the shape of the image to be formed need be driven and the electron beams irradiated on the region concerned.

According to the scanning procedure described above, a desired image can be formed on the member to be irradiated 14, and by repeating this procedure at a high speed, image display of large capacity can be practiced very precisely as not found in the prior art.

In the above descriptions of FIG. 2 to FIG. 4, description has been made about the case when the surface of the member 14 to be irradiated is divided into 3 divisions in the X direction simultaneously with division also into 3 divisions in the Y direction to irradiate the electron beams with division of nine regions of $a_{11}$–$a_{33}$, but application of the scanning system in the present invention is not limited to this example. Generally speaking, the scanning system may be considered such that the electron beams are irradiated for each region formed by dividing the member to be irradiated 14 into n divisions in the X direction and into m divisions in the Y direction. In carrying out the scanning system, while voltages in shape of n steps may be successively applied on the flat plate electrode 13a and 13b for deflection in the X direction, voltages in a shape of m steps may also be successively applied on the flat plate electrodes 13c and 13d for deflection in the Y direction.

The means for generating voltages in a shape of steps, for example, can be easily realized by application of a known D/A transforming circuit or a circuit similar thereto.

As described above, by forming an image for each partial region of the member to be irradiated with a group of electron beams radiated from a plural number of electron beam generating sections, an image of extremely great capacity can be formed over a large area within short time. Also, by applying the present invention, for example, image display device, a CRT which has greater display capacity as not found in the prior art and is also highly precise can be provided at low cost.

According to another example of the present invention, there can be used a means for preventing previously the distortion of an image formed by deflection scanning of the group of electron beams radiated from solid electron beam generating devices arranged two-dimensionally.

Referring to FIG. 5, corresponding to another Example of the present invention, the present invention provides an image forming device having an electron beam generating device 52 provided with a plural number of electron beam generating sections 51 arranged two-dimensionally, and a deflecting means 54 capable of deflection-scanning the group of electron beams emitted from the electron beam generating device 52 to the member 53 to be irradiated successively onto each partial region of the member 53 to be irradiated, wherein the image forming device is devised to have a correcting means 55 for removing the image distortion by deflection of the group of electron beams by changing the pattern of the group of electron beams emitted by controlling the driving of the electron beam generating device 52. In the present invention, the term two-dimensional arrangement refers to a plural number of arrangements both in the longitudinal and the lateral direction.

The distortion of the image when the group of electron beams emitted from the electron beam generating sections 51 arranged two-dimensionally is deflected is inherent for each region of the member 53 to be irradiated and is reproducible. Accordingly, by control of the driving of the electron beam generating device 52 with the correcting means 55 so that the group of electron beams may be emitted with a pattern which corrects the deformation with this deflection, an image without distortion can be formed.

As shown in FIG. 5, the electron beam generating device 52 and the member to be irradiated 53 are provided as opposed to each other, and a deflecting means 54 is arranged between both of these.

The electron beam generating device 52 has a plural number of electron beam generating sections 51 provided integrally, for example, by arranging a plural number of cathodes on the same substrate. As the cathode for forming the electron beam generating sections 51, a cold cathode is the most suitable. Also, the electron beam generating sections in this Example can each be driven independently of the others, and arranged two-dimensionally so as to irradiate electron beams within the predetermined linear region on the member 53 to be irradiated.

The deflecting means 54 in this Example are constituted of a pair of flat plate electrodes 54a and 54b left and right (X-direction) and a pair of flat plate electrodes 54c and 54d up and down (Y-direction). The flat electrodes 54a and 54b, 54c and 54d of the respective sets are arranged as opposed in parallel to each other respectively and are interposing there between the pathways of the whole beam generated from the electron beam generating sections 51. As between the flat plate electrodes 54a and 54b and between the flat plate electrodes 54c and 54d, desired voltage can be applied to each independently, from variable voltage sources (not shown). As the deflecting means, other than the above flat plate electrodes 54a-54d, electromagnetic coils, etc., can be used.

The member 53 to be irradiated forms a fixed image or a variable image by irradiation of electron beams. More specifically, when the present image forming device is used as a display device, a fluorescent screen, etc., provided by coating with a phosphor which emits light by irradiation of electron beam can be used. Also, when it is used as a photoresist device, it may be a member having a photoresist layer.

As shown in FIG. 5, the plural number of parallel electron beams emitted from the electron beam generating sections 51 of the electron beam generating device are deflected by the deflecting means 54 to be irradiated on the two-dimensional region on the member 53 to be irradiated. This irradiation is effected by scanning successively the whole region on the member 53 to be irradiated without overlapping by application of appropriate voltages between the flat plate electrodes 54a and 54b and between 54c and 54d which are deflecting means 54. During this operation, by controlling driving of the electron beam generating device 52 corresponding to the scanning position with a correcting means 55 as described later to change suitably the pattern of the group of electron beams, an image without distortion can be formed.

Figure 6:
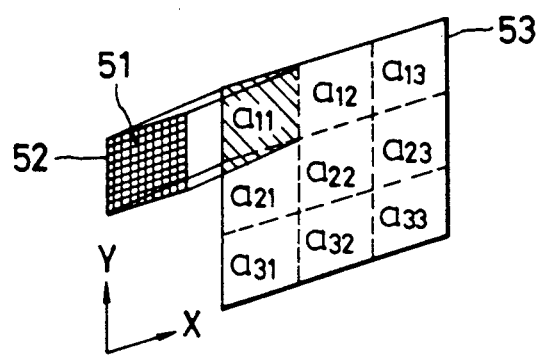

To describe further about this deflection scanning, as shown in FIG. 6, the member to be irradiated 53 is divided into regions similar to the electron beam generating sections 54 arranged two-dimensionally (e.g. 9 regions of $a_{11}$–$a_{33}$), and image formation is effected by irradiating the group of electron beams per each partial region thus divided. In this Figure, the situation in which the region $a_{11}$ is scanned is shown, but by irradiation of electron beams while driving the respective electron beam generating sections in the electron beam generating device 52 following the image data, a desired image can be formed on the member to be irradiated 53.

Figure 7A:
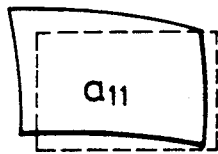
FIGS. 7A and 7B show a schematic illustration of the image distortion, FIG. 8 a schematic illustration of the principle of distortion correction, FIG. 9 a schematic illustration of one Example of the correcting means.
Figure 7B:
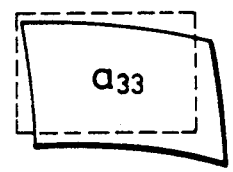

However, in the image forming device of such system, image deformation occurs depending on the characteristics, etc., of the electron optical system for scanning. For example, as shown in FIG. 7, different distortions of images are generated depending on the regions to be scanned. In this Figure, the rectangular region surrounded by the dotted line is the region where the electron beam should be irradiated, and the region surrounded by the solid line is the distorted result.

Whereas, such distortion is previously determined depending on the characteristics of the deflecting means 54, and the shape and degree of distortion is inherent for each region of $a_{11}$–$a_{33}$ and is reproducible.

Figure 8:
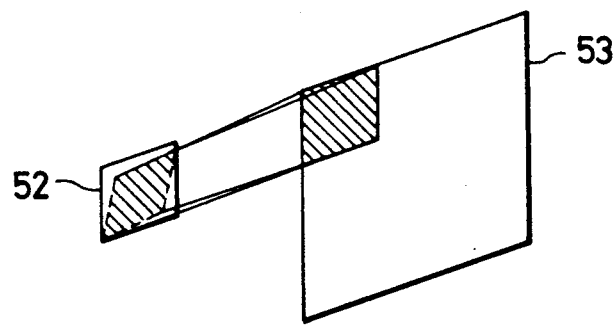

For example, when it is desired to form a rectangular image in the region $a_{11}$, by radiating an electron beam from the electron beam generating section 51 in the form in which the distortion formed by the deflecting means 54 is previously corrected as shown in FIG. 8, a desired rectangular image can be consequently obtained on the member 53 to be irradiated.

By performing transformation of such radiation pattern for each scanning region, it becomes possible to effect image formation without distortion over the whole surface of the member 53 to be irradiated.

Having described above on the basic principle of the present invention, further description is made below on the specific constitution of the correcting means 55 for performing the distortion correction by use of this principle and referring to FIG. 9. In the Figure, 56 is a driving circuit for driving individually the respective electron beam generating sections 51 of the electron beam generating device 2, and 57 is a scanning voltage generating circuit for generation of voltage to be applied on the deflecting means 54, 58 is a microprocessor for control and 59 is ROM for memorizing the transformation parameters for distortion correction.

Into the microprocessor 58 are inputted successively the data of images to be formed at the partial regions $a_{11}$, $a_{12}$ . . . $a_{33}$ in the above FIG. 6. If image data for some partial regions are inputted, the microprocessor 58 reads transformation parameters for distortion correction corresponding to the partial regions from ROM 59, and performs immediately transformation calculation for distortion correction. After completion of the calculation, the microprocessor 58 sends the control signal based on the transformation result to the driving circuit 56 to radiate electron beam and at the same time sends control signal also to the scanning voltage generating circuit 57 to deflect the electron beam toward said region.

The above actuations are performed for each partial region to irradiate electron beams, whereby a desired image can be formed without distortion on the member to be irradiated 53.

In the following, an example performed by the present inventors on transformation calculation for distortion correction in the above description is shown. The present inventors performed linear transformation (affine transformation) known as the correction means of geometrical distortion of image.

When the electron beam generating device 52 is constituted of electron beam generating sections 51 with m rows in the X direction and n rows in the Y direction, the coordinate of the electron beam generating section 51 is represented as (u, v), with the proviso that $1 \leq u \leq m$, $1 \leq v \leq n$.

Now, when a certain point on the partial region under scanning is desired to be lighted on the member 53 to be irradiated, and this point corresponds to the coordinate (x, y) (with the proviso that $1 \leq x \leq m$, $1 \leq y \leq n$), if there is no such problem of distortion as described above, the electron beam generating section 51 coinciding with the coordinate at the point to be lighted may be driven, which it is expressed as u=x, v=u.

However, practically, distortion occurs as described above. Although in the description of the above principle, the distortion was shown exaggeratedly as a curved non-equilateral shape for convenience of explanation (FIG. 7), practically the distortion is in most cases such as may be approximated by a parallelogram.

Accordingly, the present inventors performed a linear transformation (affine transformation) represented by the formula (1) to correct distortion.

$$\begin{bmatrix} u = ax + by + c \\ v = dx + ey + f \end{bmatrix} \quad (1)$$

Figure 9:
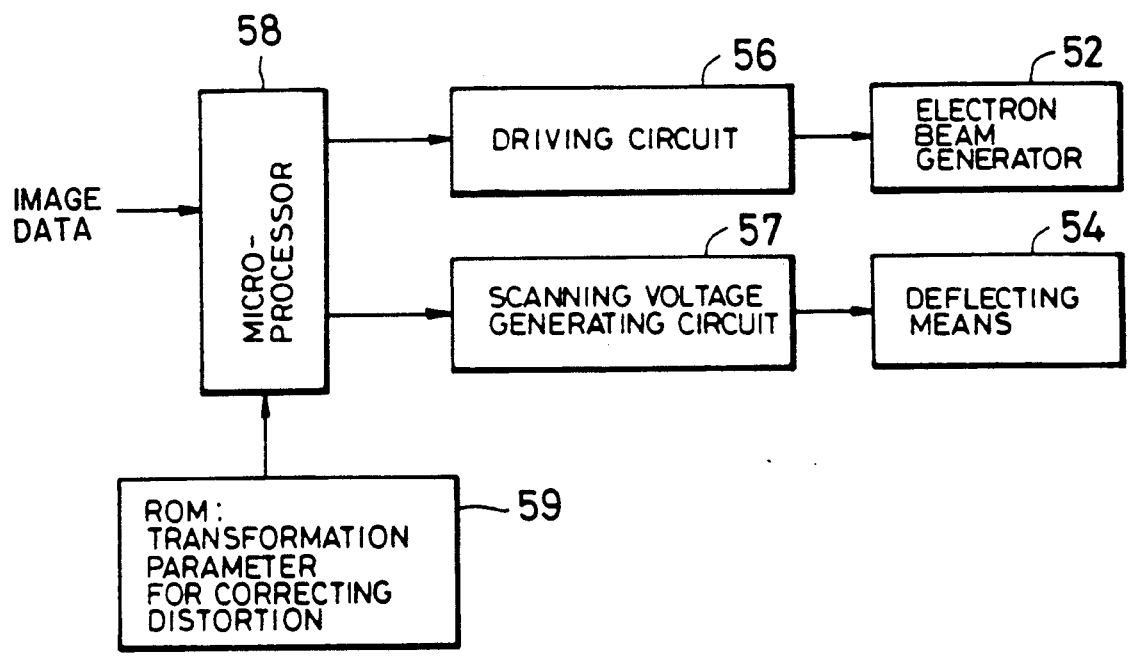

Here, a, b, c, d, e and f are coefficients representing the properties of distortions with different values depending on the partial regions to be scanned, and they are determined by previous measurements (in the above FIG. 9, the transformation parameters for distortion correction memoried in ROM 59 refers to these a, b, c, d, e and f).

As is apparent from the above description, the microprocessor 58 reads the values of a–f corresponding to the partial region from ROM 59 when image data are inputted, calculates according to the formula (1) and determines the electron beam generating sections 51 to be driven.

As the correction formula of distortion, other than the affine transformation as shown by the above formula (1), any formula fitted for the properties of the distortion generated in the image forming device concerned may be available, and in some cases, for example, the secondary conformal transformation represented by the formula (2) or the projective transformation shown by the formula (3) may be used:

$$\begin{bmatrix} u = ax + by + c(x^2 - y^2) + 2dxy + u_0 \\ v = -bx + ay + 2cxy - d(x^2 - y^2) + v_0 \end{bmatrix} \quad (2)$$

$$\begin{bmatrix} u = \frac{a_1 x + a_2 y + a_3}{a_7 x + a_8 y + 1} \\ v = \frac{a_4 x + a_5 y + a_6}{a_7 x + a_8 y + 1} \end{bmatrix} \quad (3)$$

Also, in the above description of principle in FIG. 6, there is shown an example in which irradiation was effected by dividing the member 53 to be irradiated into 9 partial regions, but the method of division is of course not limited to the example of the nine divisions as described above. Generally speaking, in most cases, the area of the member to be irradiated is by far greater than the area of the electron beam generating sections arranged two-dimensionally, and also the number of division exceeds 9 in most cases, but the present invention is applicable not depending on the number of division.

As described above, by noting the characteristic of cold cathodes that a large number of cathodes can be arranged two-dimensionally with fine pitches and the characteristic of the distortion generated by the deflecting means, the present inventors consequently invented an image forming device according to a novel distortion correcting system which has not been practiced at all in the prior art.

According to the present invention, correction of distortion which could be corrected with difficulty by the electron optical system of the prior art can be done with an extremely simple device constitution, and consequently it becomes possible to provide an image forming device of high precision, large capacity and extremely excellent image quality at low cost.

Another specific example of the present invention is an image forming device comprising a cold cathode member, an accelerating electrode member for withdrawing the electron beam generated from said cathode member, a member for modulating said electron beam, a member for deflecting said electron beam and an image deforming member by use of said electron beam, wherein a detection means for detecting the current value flowing to said accelerating electrode member and a control means for outputting a control signal in proportion to the current value detected are provided, and the electron beam quantity from said cold cathode member is maintained constant by supplying the control signal from said control means to the power source portion of said cold cathode member or accelerating electrode member.

When the current passed to the accelerating electrode is detected by the detecting means, and its current value is delivered to the control means, the control signal in proportion to the current value is outputted from the control means. When the control signal is subjected to feedback of the power section of the cold cathode member, the driving voltage from the power section is varied to control the current amount of electron beam from the cold cathode member to an appropriate value. On the other hand, when the above control signal is subjected to feedback to the power section of the accelerating electrode member, the voltage at the accelerating electrode supplied from the power portion is fluctuated to control the current passed from the accelerating electrode to the cold cathode member, whereby the current amount of electron beam is controlled.

Figure 14:
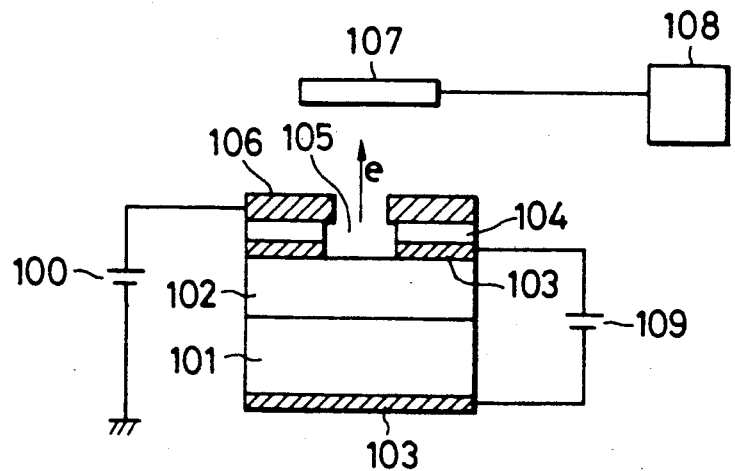
FIG. 14 is a schematic illustration of a cold cathode member of a prior art.

When the cold cathode member shown in FIG. 14 is placed in a vacuum vessel, and a positive voltage of 50 V is applied on the accelerating electrode 106 simultaneously with application of a reverse voltage of 10 V from the power source 109 to the p-n junction semiconductor, the current (the amount of electrons generated) detected by the detector 107 was gradually increased from 14 mA immediately after application to reach 50 mA, whereupon the p-n junction semiconductor was thermally destroyed. This phenomenon is considered to be caused generally by the fact that the p-n junction semi-conductor is elevated in temperature with actuation time, whereby the carrier density in the p-n junction semiconductor is increased. Also, the time of such temperature elevation differs markedly depending on the structure of the p-n junction semi-conductor or the member supporting this and the structure of the heat dissipating plate for prevention of temperature elevation, and the time before thermal destination is from about several seconds to some tens of minutes.

Figure 10:
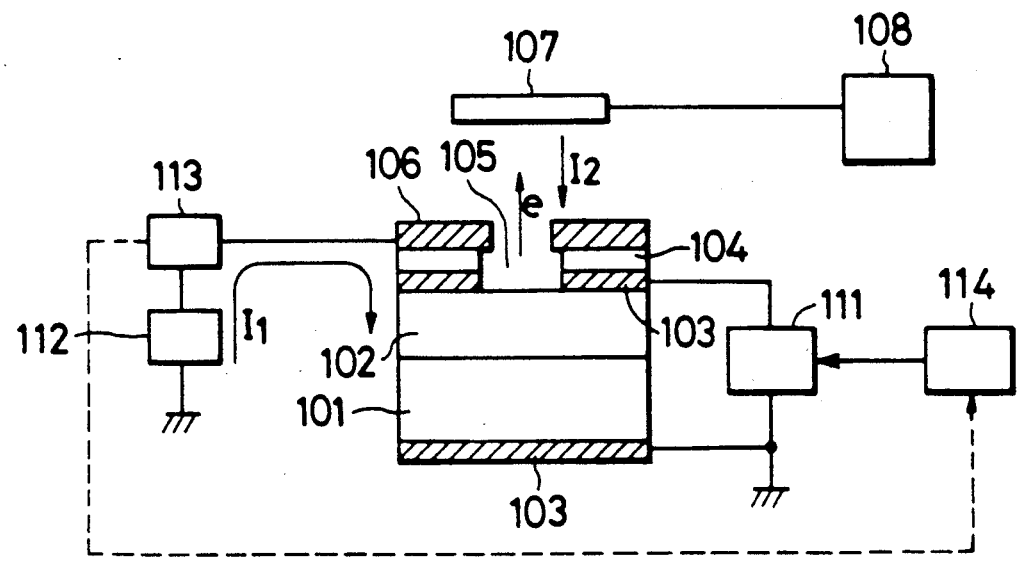
FIG. 10 and FIG. 11 are illustrations showing the embodiment of practice of the present invention.

FIG. 10 is an illustration for explanation of the cold cathode member showing a first example of the present invention. In the Figure, 101-108 correspond to the elements indicated by the same symbols in FIG. 13. 111 is a driving power source for application of voltage to the p-n semiconductor, 112 is an accelerating electrode power source for application of voltage to the accelerating electrode 106, 113 is an ammeter for measuring the current $I_1$ which passes from the accelerating power source 112 through the accelerating electrode 106 and the window 105 to the p-n junction semiconductor, and 111 is a feedback circuit for applying negative feedback to the driving power source 111 to make the current $I_1$ an appropriate value.

In the above construction, of the electrons discharged from the window 105, the amount of electrons flowing into the accelerating electrode 106 (current $I_1$) is measured by the ammeter 113, and the remainder of electrons (current $I_2$) reaches the detector. In the practical image forming device, image formation is effected by utilizing the remainder of electrons. The present inventors have found that the current $I_1$ and the current $I_2$ are in proportional relationship to each other, and the current $I_2$ can be made to flow stably by controlling constantly the current $I_1$ at an appropriate value.

This example is constructed such that the current $I_1$ is detected by the ammeter 113, and when the current $I_1$ is different from the appropriate value, the amount of electrons generated from the p-n junction semiconductor is controlled by changing the voltage on the driving power source 111 according to the feedback circuit 114, thereby effecting feedback of the current $I_1$ to the appropriate value. Accordingly, the feedback circuit 114 is set so as to control the voltage of the drying power source 111 to increase the amount of electrons discharged when the current $I_1$ is smaller and reduce the amount of electrons discharged when the current $I_1$ is larger. By use of such cold cathode member, when actuation control was effected to an appropriate current 14 mA of the current $I_2$, the current change amount was within ±5%.

Figure 11:
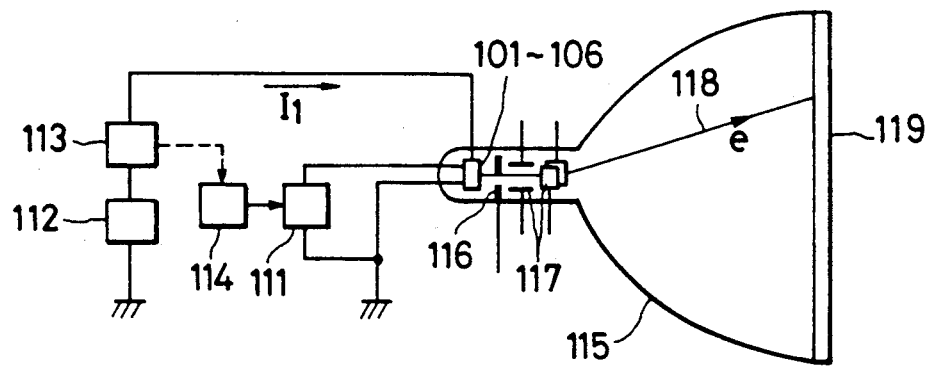

FIG. 11 is a sectional view of CRT display device by use of the above cold cathode member, in which 115 is a glass vessel which is internally kept vacuum, 116 are modulating electrodes for modulating the electron beam from the cathode member, 117 are deflecting electrodes for deflecting the electron beam, 118 is the deflected electron beam, and 119 is a face plate which is provided on its inner surface with a phosphor which emits light by collision of the electron beam thereagainst.

In the CRT display device in FIG. 11, when the cold cathode member was controlled in driving as described above simultaneously with control so as to obtain appropriate images by driving of the modulating electrodes 116 and the deflecting electrodes 117 according to conventional methods for CRT display, a stable image with little change in luminance could be obtained even when displayed for a long time.

Figure 12:
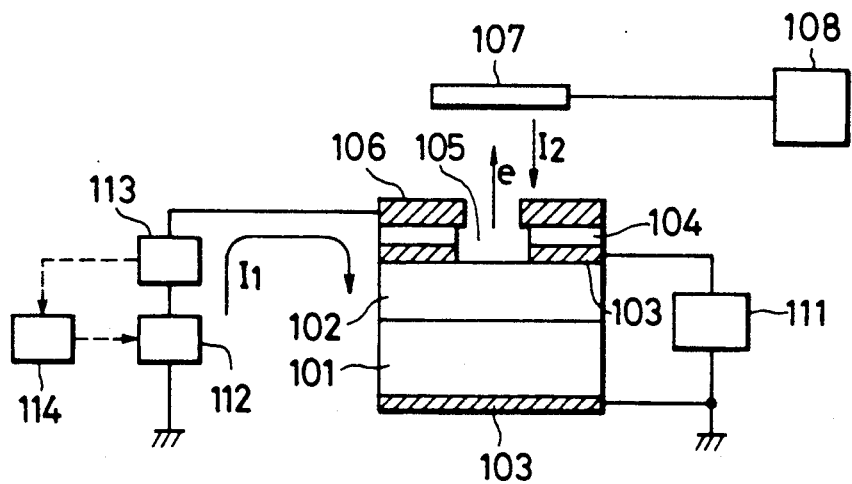
FIG. 12 and FIG. 13 are illustrations of another embodiment of the present invention.

FIG. 12 is an illustration for explanation of the cold cathode member showing a second example of the present invention. This Example is constructed such that the current $I_1$ is detected by the ammeter 113 and, when the current $I_1$ is different from the appropriate value, the voltage at the accelerating electrode power source 112 is changed by the feedback circuit 114 to control the amount of electrons generated from the p-n junction semiconductor, thereby effecting feedback of the current value $I_1$ to the appropriate value. Accordingly, the feedback circuit 114 is set so as to increase the voltage of the accelerating electrode power source 112 when the current $I_1$ is smaller, and lower the voltage when the current $I_1$ is greater. When the current $I_2$ was controlled to become the appropriate current 14 mA by use of such cold cathode member, the current change amount was within ±6%.

Figure 13:
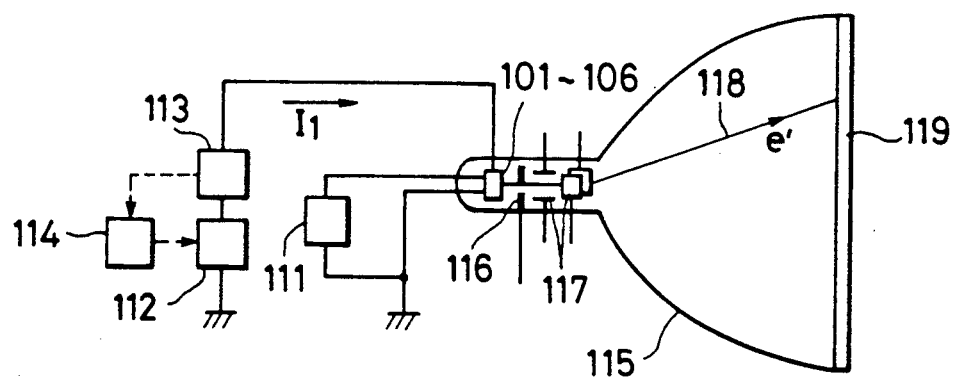

FIG. 13 is a sectional view of a CRT display device in which the above cold cathode member is used, and 115-119 shown in this Figure are the same as those shown in FIG. 11. When the same experiment as in the above FIG. 10 was conducted in the CRT display device in FIG. 13, stable images with little change in luminance could be obtained even when displayed for a long time.

In the respective examples as described above, description has been made about the case in which the electron gun is formed of one cold cathode member, but the same result as described above can be also obtained even when the electron gun may be formed with two or more cold cathode members arranged in parallel in order to make the CRT display device large in dimension and high in luminance. Also, in the respective Examples as described above, description has been made of the cold cathode member in which an electron beam is generated by supplying reverse voltage to the semiconductor having a p-n junction, but the same result as in the above examples can be also obtained even by use of a cathode member which generated an electron beam by supplying forward voltage to the semiconductor having a p-n junction.

According to the present invention, even in the case of using other cold cathode type members in which the temperature is elevated by driving at constant voltage to change the efficiency of electron discharge with temperature elevation in place of the fixed electron beam generating members, an effect equal to those of the above Examples can be expected. In this connection, all of the cold cathode type solid electron beam generating members presently known may be considered to be changed in efficiency of electron discharge with temperature elevation.

Further, the present invention is applicable to all devices employing cold cathode members other than conventional CRT display devices, such as flat type CRT display devices, recording-displaying devices utilizing an electron beam, electron beam semiconductor printing devices, etc.

As described above, according to the present invention, by controlling driving of the above cathode member so that the current passing from the accelerating electrode member for withdrawing electron beam to the cold cathode member may be an appropriate value, the amount of the electron beam generated from the cathode can be maintained appropriately to prevent temperature rise of the member itself. As the result, the image forming device by use of such member can be actuated continuously stably, and further the life of the device can be elongated.

We claim:

1. An image forming device comprising:
a cold cathode member, comprising a semiconductor, for generating an electron beam;
an accelerating electrode member for withdrawing the electron beam generated by said cathode member;
a member for modulating the electron beam;
a member for deflecting the electron beam;
an image forming member for forming an image by irradiation by the electron beam,
wherein the accelerating electrode member is integrally molded together with said cold cathode member on a side of said image forming member relative to said cold cathode member through an electrical isolator;
a detecting means for detecting a current flowing to said accelerating electrode member, which current is caused by a part of the electron beam generated by said cold cathode member; and
a control means for outputting a control signal in proportion to the current detected,
wherein variation with time of quantity of the electrons emitted per unit time from said cold cathode member to said image forming member is hindered by supplying the control signal from said control means to a power source of said cold cathode member or of said accelerating electrode member.

2. An image forming device comprising:
a cold cathode member comprising at least two cold cathode type solid electron beam generating elements arranged in parallel, each comprising a semiconductor, for generating an electron beam;
an accelerating electrode member, for each cold cathode type solid electron beam generating element, for withdrawing the electron beam generated by its respective said cold cathode type solid electron beam generating element;
a member for modulating the electron beam;
a member for deflecting the electron beam;
an image forming member for forming an image by irradiation by the electron beam,
wherein each accelerating electrode member is disposed on a side of said image forming means relative to said cold cathode type solid electron beam generating element therefor in a state of being electrically isolated from said cold cathode type solid electron beam generating element;
a detecting means for detecting a current flowing to each accelerating electrode member; and
a control means for outputting a control signal in proportion to the current detected flowing to each accelerating electrode member.
wherein variation with time of quantity of the electrons emitted per unit time from each cold cathode type solid electron beam generating element to said image forming member is hindered by supplying the control signal from said control means to a power source of each cold cathode type solid electron beam generating element or of the accelerating electrode member therefor.

3. An image forming device comprising:
a cold cathode member, comprising a semiconductor, for generating an electron beam;
an accelerating electrode member for withdrawing the electron beam generated by said cathode member;
a member for modulating the electron beam;
a member for deflecting the electron beam;
an image forming member for forming an image by irradiation by the electron beam,
wherein the accelerating electrode member is disposed on a side of said image forming means relative to said cold cathode member in a state of being electrically isolated from said cold cathode member;
a detecting means for detecting a current flowing to said accelerating electrode member; and
a control means for outputting a control signal in proportion to the current detected.
wherein variation with time of quantity of the electrons emitted per unit time from said cold cathode member to said image forming member is hindered by supplying the control signal from said control means to a power source of said cold cathode member or of said accelerating electrode member, and
wherein said cold cathode member is a cathode member which generates the electron beam by supplying a reverse voltage to said semiconductor, said semiconductor having a p-n junction.

4. An image forming device according to claim 1, wherein said cold cathode member is a cathode member which generates the electron beam by supplying a forward voltage to said semiconductor, said semiconductor having a p-n junction.

5. An image forming device according to claim 1, wherein said cold cathode member and said accelerating electron member are integrated.

6. An image forming device having an electron beam generating device provided with a plurality of electron beam generating sections, each comprising a cold cathode member, arranged two-dimensionally and a deflecting means capable of scanning the electron beams emitted by said electron beam generating device to a member to be irradiated successively to sections of a region of the member to be irradiated, wherein a correcting means is provided for correcting image distortion compared with original image data for each of the sections of the region, and the electron beam generating device is driven according to the image data from the correcting means.

7. An image forming device having an electron beam generating device provided with a plurality of electron beam generating sections arranged two-dimensionally and a deflecting means, for deflecting electron beams emitted from said electron beam generating device in an X direction and in a Y direction perpendicular to the X direction, capable of scanning the electron beams emitted by said electron beam generating device to a member to be irradiated successively to sections of a region of the member to be irradiated, wherein a correcting means is provided for correcting image distortion compared with original image data for each of the sections of the region, and the electron beam generating device is driven according to the image data from the correcting means.

8. An image forming device comprising:
a cold cathode member, comprising a semiconductor, for generating an electron beam;
an accelerating electrode member for withdrawing the electron beam generated by said cathode member;
a member for modulating the electron beam;
an image forming member for forming an image by irradiation of the electron beam;
wherein said accelerating electrode member is integrally molded together with said cold cathode member on a side of said image forming member relative to said cold cathode member through an electrical isolator;

a detecting means for detecting a current flowing to said accelerating electrode member, which current is caused by a part of the electron beam generated by said cold cathode member; and a control means for outputting a control signal in proportion to the current detected, wherein variation with time of quantity of the electrons emitted per unit time from said cold cathode member to said image forming member is kept within a range of ±5% by supplying the control signal from said control means to a power source of the cold cathode member.

9. An image forming device according to claim 8, wherein said cold cathode member is a cathode member which generates the electron beam by supplying a forward voltage to said semiconductor, said semiconductor having a p-n junction.

10. An image forming device according to claim 8, wherein said cold cathode member and said accelerating electron member are integrated.

11. An image forming device comprising:

a cold cathode member comprising at least two cold cathode type solid electron beam generating elements arranged in parallel, each comprising a semiconductor, for generating an electron beam;

an accelerating electrode member, for each cold cathode type solid electron beam generating element, for withdrawing the electron beam generated by its respective said cold cathode solid electron beam generating element;

a member for modulating the electron beams;

an image forming member for forming an image by irradiation of the electron beams;

wherein each accelerating electrode member is placed on a side of said image forming means relative to said cold cathode solid electron generating element therefor in a state of being electrically isolated from said cold cathode solid electron beam generating element;

a detecting means for detecting a current flowing to each accelerating electrode member; and a control means for outputting a control signal in proportion to the current detected in each detecting means, wherein variation with time of current caused by electrons irradiated onto said image forming member is kept within a range of ±5% by supplying the control signal from said control means to a power source of the each cold cathode solid electron beam generating element.

12. An image forming device comprising:

a cold cathode member, comprising a semiconductor, for generating an electron beam;

an accelerating electrode member for withdrawing the electron beam generated by said cathode member;

a member for modulating the electron beam;

an image forming member for forming an image by irradiation of the electron beam;

wherein said accelerating electrode member is placed on a side of said image forming means relative to said cold cathode member in a state of being electrically isolated from said cold cathode member;

a detecting means for detecting a current flowing to said accelerating electrode member; and a control means for outputting a control signal in proportion to the current detected, wherein variation with time of current caused by electrons irradiated onto said image forming member is kept within a range of ±5% by supplying the control signal from said control means to a power source of the cold cathode member, and wherein said cold cathode member is a cathode member which generates the electron beam by supplying a reverse voltage to said semiconductor, said semiconductor having a p-n junction.

13. An image forming device comprising:

a cold cathode member, comprising a semiconductor, for generating an electron beam;

an accelerating electrode member for withdrawing the electron beam generated by said cathode member;

a member for modulating the electron beam;

a member for deflecting the electron beam;

an image forming member for forming an image by irradiation of the electron beam;

wherein said accelerating electrode member is integrally molded together with said cold cathode member on a side of the image forming member relative to said cold cathode member through an electrical isolator;

a detecting means for detecting current flowing to said accelerating electrode member, which current is caused by a part of the electron beam generated by said cold cathode member; and a control means for outputting a control signal in proportion to the current detected, wherein variation with time of of quantity of the electrons emitted per unit time from said cold cathode member to said image forming member is kept within a range of ±6% by supplying the control signal from said control means to a power source of said accelerating electrode member.

14. An image forming device comprising:

a cold cathode member comprising at least two cold cathode solid electron beam generating elements arranged in parallel, each comprising a semiconductor, for generating an electron beam;

an accelerating electrode member for each cold cathode solid electron beam generation element for withdrawing the electron beam generated by its respective said cold cathode solid electron beam generating element;

a member for modulating the electron beams;

a member for deflecting the electron beams;

an image forming member for forming an image by irradiation of the electron beams;

wherein said accelerating electrode member for each cold cathode solid electron beam generating element is placed on a side of the image forming means relative to said cold cathode solid electron beam generating element in a state of being electrically isolated from said cold cathode solid electron beam generating element;

a detecting means for detecting current flowing to each accelerating electrode member; and a control means for outputting a control signal in proportion to the current detected, wherein variation with time of current caused by electrons irradiated onto said image forming member is kept within a range of ±6% by supplying the control signal from said control means to a power source of each accelerating electrode member.

15. An image forming device comprising:
a cold cathode member, comprising a semiconductor, for generating an electron beam;
an accelerating electrode member for withdrawing the electron beam generated by said cathode member;
a member for modulating the electron beam;
a member for deflecting the electron beam;
an image forming member for forming an image by irradiation of the electron beam;
wherein said accelerating electrode member is placed on a side of the image forming means relative to said cold cathode member in a state of being electrically isolated from said cold cathode member;
a detecting means for detecting current flowing to said accelerating electrode member; and
a control means for outputting a control signal in proportion to the current detected, wherein variation with time of current caused by electrons irradiated onto said image forming member is kept within a range of ±6% by supplying the control signal from said control means to a power source of said accelerating electrode member, and
wherein said cold cathode member is a cathode member which generates the electron beam by supplying a reverse voltage to said semiconductor, said semiconductor having a p-n junction.

16. An image forming device according to claim 13, wherein said cold cathode member is a cathode member which generates the electron beam by supplying a forward voltage to said semiconductor, said semiconductor having a p-n junction.

17. An image forming device according to claim 13, wherein said cold cathode member and said accelerating electron member are integrated.

* * * * *

UNITED STATES PATENT AND TRADEMARK OFFICE
CERTIFICATE OF CORRECTION

PATENT NO. : 5,025,196

DATED : June 18, 1991

INVENTOR(S) : HIDETOSHI SUZUKI, ET AL.  Page 1 of 4

It is certified that error appears in the above-identified patent and that said Letters Patent is hereby corrected as shown below:

ON THE TITLE PAGE:

IN [56] REFERENCES CITED

U.S. PATENT DOCUMENTS,
        "4,363,930  12/1981  Van Gorkom et al." should read
        --4,303,930  12/1981  Van Gorkom et al.--.

COLUMN 1

Line 17, "of" should be deleted.
    Line 21, "Laid-open" should read --Laid-Open--.
    Line 29, "decreasing" should read --decrease--.
    Line 37, "such" (first occurrence) should be deleted.
    Line 39, "technique" should read --techniques--.

COLUMN 2

Line 22, "accelerating electrodes, 106" should read
        --accelerating electrode 106,--.
    Line 34, "of CRT," should read --of a CRT,--.
    Line 65, "the" should read --a--.

COLUMN 3

Line 13, "electron" should read --an electron--.
    Line 28, "FIG. 2 a" should read --FIG. 2 is a--.
    Line 30, "FIG. 3 a" should read --FIG. 3, a--.
    Line 35, "FIG. 6 a" should read --FIG. 6 is a--.
    Line 39, "FIG. 8 a" should read --FIG. 8 is a--.
    Line 41, "FIG. 9 a" should read --FIG. 9 is a--.

UNITED STATES PATENT AND TRADEMARK OFFICE
CERTIFICATE OF CORRECTION

PATENT NO. : 5,025,196
DATED : June 18, 1991
INVENTOR(S) : HIDETOSHI SUZUKI, ET AL.

It is certified that error appears in the above-identified patent and that said Letters Patent is hereby corrected as shown below:

COLUMN 4

Line 23, "irradiating" should read --irradiate--.
    Line 67, "as" should be deleted.

COLUMN 5

Line 42, "on" should read --onto--.
    Line 54, "(saw tooth" should read --(sawtooth--.
    Line 67, "trodes 13a" should read --trode 13a--.

COLUMN 6

Line 32, "13cand" should read --13c and--.
    Line 42, "short" should read --a short--.
    Line 43, "example, image" should read --example, to an image--.

COLUMN 7

Line 34, "there between" should read --therebetween--.
    Line 38, "desired" should read --a desired--.

COLUMN 8

Line 20, "Whereas, such" should read --Such--.
    Line 42, "device 2," should read --device 52,--.

UNITED STATES PATENT AND TRADEMARK OFFICE
CERTIFICATE OF CORRECTION

PATENT NO. : 5,025,196

DATED : June 18, 1991

INVENTOR(S) : HIDETOSHI SUZUKI, ET AL.

Page 3 of 4

It is certified that error appears in the above-identified patent and that said Letters Patent is hereby corrected as shown below:

COLUMN 9

Line 15, "it" should be deleted.
   Line 25, "distortion." should read --distortion:--.

COLUMN 10

Line 67, "semi-conductor" should read --semiconductor--.

COLUMN 11

Line 3, "semi-conductor" should read --semiconductor,--.
   Line 4, "heat" should read --heat- --.
   Line 6, "destination" should read --destruction--.
   Line 41, "drying" should read --driving--.

COLUMN 12

Line 37, "generated" should read --generates--.
   Line 44, "elevation" should read --elevation;--.
   Line 67, "elongated." should read --lengthened.--.

UNITED STATES PATENT AND TRADEMARK OFFICE
CERTIFICATE OF CORRECTION

PATENT NO. : 5,025,196

DATED : June 18, 1991

INVENTOR(S) : HIDETOSHI SUZUKI, ET AL.

It is certified that error appears in the above-identified patent and that said Letters Patent is hereby corrected as shown below:

COLUMN 16

Line 33, "of of" should read --of--.
Line 45, "generation" should read --generating--.

Signed and Sealed this

Second Day of March, 1993

Attest:

STEPHEN G. KUNIN

Attesting Officer

Acting Commissioner of Patents and Trademarks